March 31, 1925.
J. L. SHROYER
ELECTRIC BAKING APPARATUS
Filed June 15, 1923
1,532,086
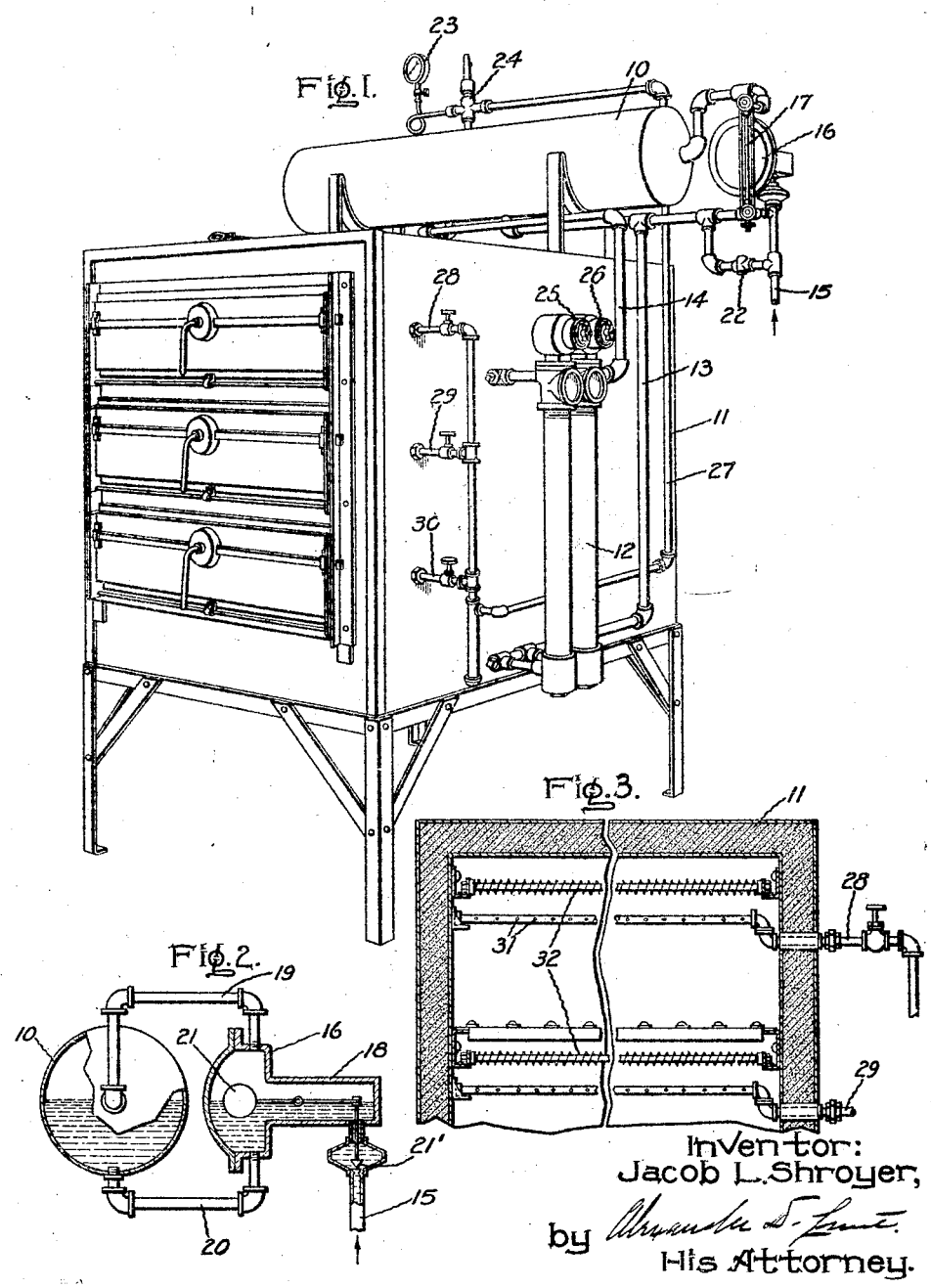

Patented Mar. 31, 1925.

1,532,086

UNITED STATES PATENT OFFICE.

JACOB L. SHROYER, OF CHICAGO, ILLINOIS, ASSIGNOR TO EDISON ELECTRIC APPLIANCE CO., INC., OF CHICAGO, ILLINOIS, A CORPORATION OF NEW YORK.

ELECTRIC BAKING APPARATUS.

Application filed June 15, 1923. Serial No. 645,505.

*To all whom it may concern:*

Be it known that I, JACOB L. SHROYER, a citizen of the United States, residing at Chicago, county of Cook, State of Illinois, have invented certain new and useful Improvements in Electric Baking Apparatus, of which the following is a specification.

My invention relates to electric baking apparatus and has for its object the provision in a unitary structure of an electric oven and an electric steam generator.

In various baking operations it is necessary and customary to admit steam to the oven to obtain certain desired results, for example, in the making of hard crust rolls steam is nearly always used at some period in the baking operation. It has heretofore been the practice to supply this steam from a suitable steam generator separate from the oven and forming a distinct and independent unit.

In carrying out my invention I heat the oven and generate the steam for the oven by electrical means and mount the electric steam generator on the oven, thus forming a unitary structure complete in itself for performing the baking operation.

For a more complete understanding of my invention reference should be had to the accompanying drawing in which Fig. 1 is a perspective view of electric baking apparatus embodying my invention; Fig. 2 is a section view of the automatic water level device; while Fig. 3 is a fragmentary section view of the oven.

Referring to the drawing, in one form of my invention a steam boiler 10 is mounted on the top of an electric baking oven 11 shown as a type suitable for use in hotels and bakeries. A suitable electric circulation heater 12 mounted at the side of the oven 11 is provided for the boiler 10 and is connected to the boiler in a well known manner through circulation pipes 13 and 14. Water is supplied to the boiler through a pipe 15 leading from a source of pressure supply of water, such as the city water main.

A constant water level device 16 is provided for controlling the admission of water to the boiler so as to maintain a constant water level which is indicated on the water-glass 17. As shown in Fig. 2 the constant water level device 16 may consist of a closed container 18 communicating with the boiler through pipes 19 and 20. In this container is a float 21 which controls a water inlet valve 21' so as to maintain the water at a predetermined level.

Connected in shunt to the constant water level device 16 is a check valve 22 which prevents water from entering the boiler from the pressure supply, but acts as a bypass in case the boiler pressure exceeds the pressure in the water supply main, allowing the water from the boiler to be forced out against the pressure in the supply main. The pressure in the boiler is thereby limited to the pressure in the supply main, and the boiler therefore protected against excessively high pressures. A pressure gauge 23 and a maximum pressure valve 24 are provided for the boiler. The electric water heater 12 is connected to a suitable electrical supply source through control switches 25 and 26.

Steam from the boiler 10 is led to the oven through a pipe 27 and is admitted to the various compartments of the oven through branch pipes 28, 29 and 30, a shut-off valve being provided in each branch. The pipes 28, 29 and 30 preferably enter the oven near the front and extend across the oven, as shown in Fig. 3. They are provided with perforations 31 to assure uniform distribution of the steam to the interior of the oven.

The oven is preferably heated by means of resistance heating units 32, shown as the type disclosed in U. S. Patent 1,203,909 to Ruckle. A heating unit is preferably located at the top of each compartment with one at the bottom of the lower compartment.

As thus constructed, it will be observed that I have provided an electric cooking oven and steam generator in a unitary structure. By means of this apparatus all of the various baking operations can be performed. By mounting the boiler 10 in its elevated position on top of the oven with the electric heater for the boiler some distance below, very good circulation and hence rapid heating of the water in the boiler is effected.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention the scope of which is set forth in the annexed claims.

What I claim as new and desire to secure by Letters Patent of the United States, is:

1. Electric baking apparatus comprising in combination a baking oven, a steam boiler mounted on top of said oven, and an electric heater for said boiler mounted on the side of said oven beneath said boiler, perforated pipes extending across the interior of said oven, and means for admitting steam from said boiler to said pipes.

2. Electric baking apparatus comprising in combination a baking oven, a steam boiler mounted on said oven, an electric heater for said boiler mounted on said oven beneath said boiler, an automatic water level device for said boiler, a source of pressure water supply for said boiler, and a check valve connected in a bypass pipe around said automatic water level device whereby the pressure in said boiler is limited to the pressure of said water supply source.

In witness where I have hereunto set my hand this 12th day of June, 1923.

JACOB L. SHROYER.